ENERGIZING CIRCUITS FOR INDUCTIVE LOADS

Filed June 9, 1965

INVENTORS
MARVIN FELCHECK
NANJUNDIAH N. MURTHY
BY
Stewart F. Moore
ATTORNEY

United States Patent Office 3,381,180
Patented Apr. 30, 1968

3,381,180
ENERGIZING CIRCUITS FOR INDUCTIVE LOADS

Marvin Felcheck, Bayside, N.Y., and Nanjundiah N. Murthy, Stamford, Conn., assignors to American Machine & Foundry Company, a corporation of New Jersey Filed June 9, 1965, Ser. No. 462,484
11 Claims. (Cl. 317—148.5)

Figure 1:
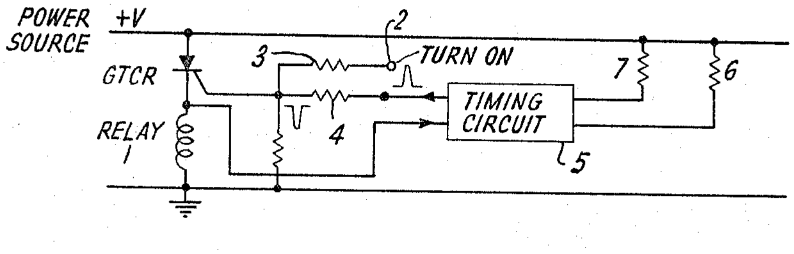

This invention relates to energization circuits for load devices and particularly to circuits for supplying pulse energization to loads, for example, inductive loads, under control of unregulated power sources.

In automatic systems, such as computers and automatic machinery, it has been found desirable to employ a number of electromagnetic relays in various forms as, for example, stepping relays, solenoids, multi-contact relays, etc., requiring the application thereto of pulses of the proper amount of power and of predetermined width or duration to provide reliable operation, under control of command signals to produce the desired type of control. A number of circuits for supplying such fixed-width pulses have been designed heretofore, but usually have required the use of controlling power sources therewith which are so closely regulated as to prevent variation of the time constants of the circuits on which the pulse duration depends, under the usual operating conditions.

It is a general object of the invention to provide improved pulse energization of a load device.

Another object is to provide a circuit for supplying energizing pulses of the required amount of power and of substantially constant width or duration to an inductive load, such as an electromagnetic relay device, regardless of fluctuations in the voltage of the controlling power source.

Another object is to provide an energization circuit for an electromagnetic device or other inductive load device where the controlling source of voltage is limited only by the characteristics of the load, and within a given range of voltage will provide electrical energizing pulses to the load, each of relatively constant, predetermined duration or width.

The energizing circuits of the invention include as a primary power switching device, a control rectifier which is a multi-layer semiconductor device having a cathode, anode and a single gate electrode, of the type which is capable of becoming conductive or turned on by a positive pulse applied to its gate electrode and becoming non-conductive by a negative pulse applied to the same gate electrode. The start pulses are provided by external means, and a timing circuit controlled by the primary switching device when it has been turned on is used to apply a negative pulse to the gate of the primary device a given time after that device becomes conductive in response to a starting pulse, to stop energization of the load. The timing circuit in one embodiment includes a silicon-controlled switch, a power divider and two capacitors and charge and discharge circuits therefor for producing the delayed negative stop pulses. The timing circuit is controlled from the power source so that its time constant, and therefore the width of the energizing pulses, is independent of voltage fluctuations in the power source.

In a second embodiment of the invention, a unijunction transistor is used as the secondary switching device and a transformer is employed at the gate of the primary switching device to provide isolation between the turn-on and turn-off circuits. In a third embodiment, the unijunction transistor controls a high power semiconductor switch to provide a high power negative pulse to the turn-off winding of the transformer at the gate of the primary switching device.

Figure 2:
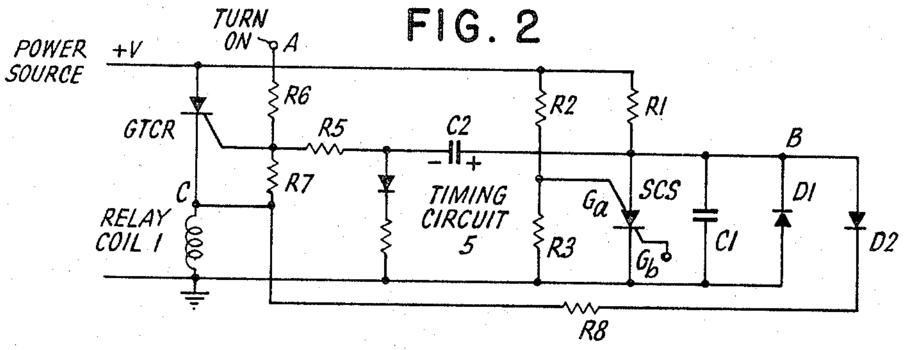
Figure 3:
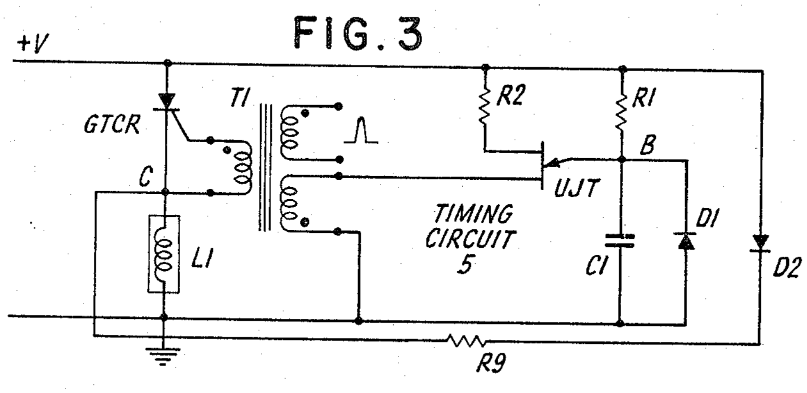
Figure 4:
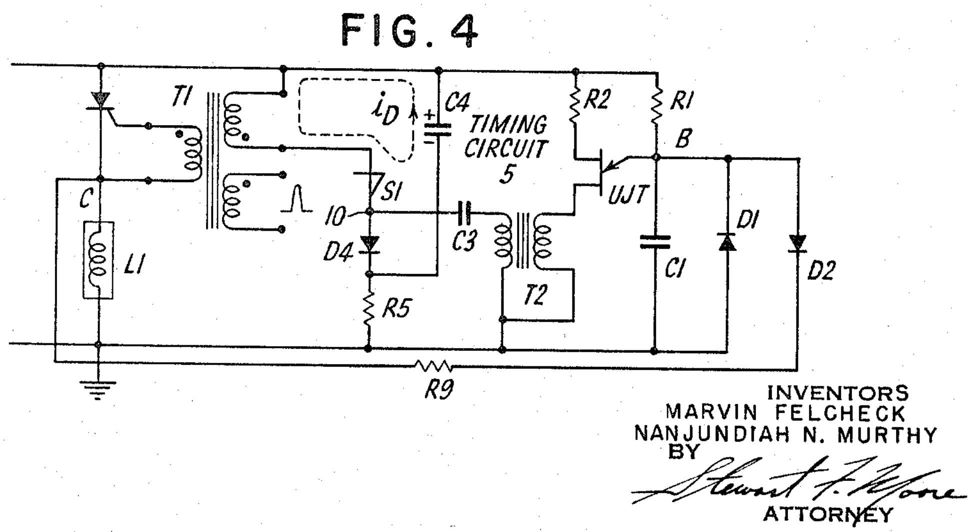

The above and other features and objects of the invention will be better understood from the following detailed description thereof when it is read in conjunction with the accompanying drawings in which:

FIG. 1 shows in block diagrammatic form a load energizing circuit of the general type used in the invention; and FIGS. 2, 3 and 4, respectively, show schematic circuit diagrams of different embodiments of the invention.

In the circuit of FIG. 1, the inductive load to be energized is represented by the electromagnetic relay 1. The primary switching device for controlling the supply of pulsing power to that relay is a gate turn-off control rectifier GTCR which is a multi-layer semi-conductor device having a cathode, an anode and a single gate electrode. This device is of the type that can be turned on, i.e., made conductive, by a positive signal applied to its gate; and when it is conductive, it can be turned off, or made non-conductive, by a negative signal applied to the same gate. As shown, one terminal of the winding of the relay 1 is connected to ground and its other terminal is connected to the cathode of GTCR. The anode of GTCR is connected to the positive side V+ of the controlling direct current power source. The device GTCR is adapted to be turned on by a positive start pulse of short duration supplied from an external source, which is applied to terminal 2 and through a resistor 3 to the gate of GTCR, and is adapted to be turned off or made non-conductive a fixed period of time later by a negative pulse applied to the same gate through a resistor 4 under control of the timing circuit 5. The timing circuit 5 is connected to the device GTCR in such manner that its timing action is started when the latter device is made conductive. Thus, the relay 1 is energized for a fixed length of time as soon as a start pulse is applied. The timing circuit 5 is supplied with energizing power from V+ through resistors 6 and 7.

FIG. 2 shows in more detail one energizing circuit of the type shown in FIG. 1, employing a silicon-controlled semi-conductor device SCS as a secondary switch in the timing circuit 5. Referring to FIG. 2, the anode-cathode path of the device GTCR, operating as the primary switching device, is connected in series with the winding of relay 1 between the V+ terminal of the direct current power source and ground. The anode of the switch SCS is connected through the series resistor R1 to the positive terminal V+ of the DC power source, and its cathode is connected to ground. A capacitor C1 in parallel with a diode D1 poled in the direction shown, is connected across the anode-cathode path of SCS, and the diode D2 poled in the direction shown, is connected between the junction point B of the capacitor C1 and the resistor R1 and resistor R8. R8 is connected to the junction of R2 and relay 1.

A power divider comprising resistances R2 and R3 in series is connected across the circuit comprising the anode-cathode path of SCS and R1 in series. An intermediate point 8 on the power divider R1, R3 is connected to the gate *Ga* of SCS so that a desired positive potential is applied to that gate. No connection is made to the other gate *Gb* of SCS.

A circuit including a capacitor C2, a diode D3 poled in the direction indicated and a resistor R4 in series is connected directly across the anode-cathode path of SCS. The junction 9 between the capacitor C2 and the diode D3 is connected through series resistor R5 to the gate of GTCR. A turn-on input terminal A is connected through the resistor R6 to the gate of GTCR, and a resistor R7 is connected across the gate and cathode of GTCR.

The circuit of FIG. 2 operates in the following manner. The primary switch GTCR and the secondary switch SCS are both normally in the non-conductive condition. The capacitor C1 is in the discharged condition because it is initially clamped to a low potential through R8 and the winding of the relay 1 by diode D2, because the resistance R1 is made much larger than the DC resistance of the winding of R8 and relay 1. When a positive pulse from an external source is applied to input terminal A and through resistor R6 to the gate of the device GTCR, that device will be turned on and the positive voltage V+ of the power source is applied through its new conductive anode-cathode path to the winding of relay 1. This will cause the diode D2 connected to the upper terminal of that winding to be back-biased to permit the capacitor C1 to come out of clamp and to begin the charge toward V+ through resistor R1. The function of the diode D1 is to prevent any reverse voltage from appearing across C1 due to the inductive voltage kick of the load. The capacitor C2 follows the charge of capacitor C1 with the polarity shown. (The time constant R4C2 is made much smaller than that of R1C1 by proper selection of the relative values of the elements, so that the effect of R4C2 is negligible.) When the charge on the capacitor C1 causes the voltage applied across the anode-cathode path of SCS to exceed the voltage at which the gate Ga of SCS is held by power divider R2R3, the device SCS becomes conductive to permit the capacitors C1 and C2 to discharge therethrough. The discharge of capacitor C2 through SCS causes the potential at junction point 9 to change so as to apply a negative signal through resistor R5 to the gate of GTCR. This will cause device GTCR to be turned off. The diode D3 is pointed in the direction to prevent the resistor R4 from absorbing most of the turn-off voltage. Thus, the circuit is returned to its initial condition. Each starting pulse applied to the terminal A will cause the same operation. The time for which the relay 1 is energized by pulses of predetermined width is determined by the time constant R1C1, and is not affected by fluctuations of the voltage of the controlling power source, as the charging of the capacitor C1 is accomplished by applying a reference voltage through R1 which is proportional to the voltage fluctuations.

FIG. 3 shows another embodiment of the energizing circuit of one invention which differs from the circuit of FIG. 2 in that a semiconductor double-base diode UJT, known in the art as a unijunction transistor, is used in place of the semiconductor SCS device and associated circuits for the secondary switching device in the timing circuit 5; and a transformer is used at the gate of the control rectifier semiconductor device GTCR acting as the primary switch, to provide isolation between the turn-off and turn-on circuits.

Referring to FIG. 3, the anode-cathode path of the device GTCR is connected in series with the load L1, which may be an electromagnetic relay, between the positive terminal V+ of the controlling direct current power source and ground. A diode D1 poled in the direction shown and series resistor R3 are connected between the junction point C between the device GTCR and the load L1, and the junction point B between the capacitor C1 and the resistance R1 in timing circuit 5. A transformer having three coupled windings 1–2, 3–4, and 5–6 is used for connecting the turn-on and turn-off circuits to the gate of GTCR and to the unijunction transistor UJT on the timing circuit 5. The upper base terminal of the unijunction transistor UJT is connected to the V+ terminal of the DC power source through the resistor R2 and its lower base electrode is connected through the turn-off winding 3–4 to ground so that it is effectively connected in shunt of the capacitor C1 and the resistor R1 in series. The emitter of transistor UJT is connected to the junction point B between C1 and R1.

The circuit of FIG. 3 operates as follows:

In the OFF (non-conductive) state of the GTCR device, the junction point B between the capacitor C1 and the resistor R1 in timing circuits is clamped essentially to ground through the load L1, since the resistance of R1 is chosen much larger than the DC resistance of L1 and R3. If now a positive turn-on pulse is applied to the terminals of the transformer winding 1–2, a positive voltage will be induced in the winding 5–6 and applied to the gate of GTCR to turn on or make the anode-cathode path of GTCR conductive, causing point C to be clamped to V+ of the power source applying power to the load L1. The resulting voltage at C will cause diode D1 to be back-biased permitting the capacitor C1 to start to charge to V+ through resistor R1 with a time constant of R1C1. When the firing potential of UJT set by the voltage applied to its gate electrode is reached at the point B, the capacitor C1 discharges through the now conductive transistor UJT into the winding 3–4 of transformer T1. This induces a negative pulse at terminal 5 of the winding 5–6 which makes the GTCR device non-conductive turning it off and stopping transmission of power to the load L1.

FIG. 4 shows a high power version of the circuit of FIG. 3, in which a high power turn-off pulse is supplied to the turn-off winding of transformer T1. It differs essentially from the circuit of FIG. 3 in the following particulars. The lower base terminal of UJT is connected to ground through the primary winding of a second transformer T1, instead of directly to winding 3–4 of the first transformer T1 as in FIG. 3. Also, a circuit comprising a capacitor C3, a diode D4 and a resistor R5 in series is connected across the secondary winding of transformer T2. A capacitor C4 is connected in series between the junction of resistor R5 and diode D4 and terminal 3 of the turn-off winding 3–4, and a Shockley four-layer semiconductor S1 diode or similar high power switching device is connected between the junction point 10 between diode D4 and capacitor C3 and the other terminal 4 of the turn-off winding 3–4.

The circuit of FIG. 4 operates as follows:

In the OFF (non-conductive) state of semiconductor device GTCR, point B in the timing circuit 5 is clamped to ground via R3 and diode D1 poled in the direction shown and the junction point C between the cathode of GTCR and the load L1. Junction point C between load L1 and the cathode of GTCR is also essentially at ground potential, and GTCR, S1 and UJT are all in their off (non-conductive) states. A turn-on positive pulse is now applied to the terminals of the winding 5–6 which induces a positive pulse in winding 1–2 causing GTCR to turn on. This causes the point C to be clamped to V+ applying power to the load L1. Diode D1 is now back-biased to unclamp C1 from ground so that point B in the timing circuit 5 begins to rise in potential as the capacitor C1 is charged from V+ of the power source through R1 with a time constant of R1C1. When the firing potential of VJT determined by the potential applied to its gate at point B is reached, the capacitor C1 discharges through the now conductive path of UJT into the input winding of transformer T2 which induces a negative pulse in the output winding of that transformer which appears at the cathode of Shockley diode S1 via capacitor C3 and point 10. The Shockley diode C1 is turned on by this negative pulse. Capacitor C4 previously charged from V+ of the power source through resistance R5 with the polarity shown, discharges through the turn-off winding 3–4, the Shockley device S1 and the diode D4. The discharge current is shown by the dotted line iD. A negative pulse is induced by winding 3–4 into the winding 1–2 of T1 which turns GTCR off.

After capacitor C4 is fully discharged, the Shockley device S1 turns off due to the lack of holding current since R5 is chosen to be large enough not to supply the required holding current.

Though several particularly advantageous embodiments of the invention have been chosen for illustration purposes, various changes in these embodiments and other embodiments will occur to persons skilled in the art without departing from the spirit and scope of the invention as defined in the appended claims.

What is claimed is:

1. A circuit for supplying energizing pulses of substantially constant width to a load comprising in combination with said load; a source of direct current supply voltage; a primary switching device of the multi-layer semiconductor type having a cathode, an anode and a gate electrode; a normally-disabled anode-cathode path for said device connected in series with said load across said source; a first and a second terminal connected to said gate electrode; timing means having a predetermined RC time constant, connected to said primary device and to said source; means for applying to said gate electrode through said first terminal at least one starting positive pulse of short duration to cause the enablement of said anode-cathode circuit to turn on said device so that energizing power is supplied therethrough to said load; and means in said timing means responsive to the turning on of said primary device to start the timing action in said timing means and cause it to supply at the end of a predetermined time interval after the device has been turned on, a negative stop pulse to said gate electrode through said second terminal disabling said anode-cathode path and thus causing that device to turn off to stop the flow of energizing power to said load and to return the timing means to the initial unoperated condition; the time for which said load is energized between each starting and stopping pulse being determined by the time constant RC of said timing means.

2. The circuit of claim 1, in which the connections of said source to said timing means are such that its time constant, and thus the width of the energizing pulses applied to said load, are substantially independent of fluctuations of the voltage of said source.

3. The circuit of claim 1, in which the width of the energizing pulses for said load are maintained independent of the voltage fluctuations of said source by utilizing resistance means for applying power proportional to these fluctuations as the control voltage to said timing means.

4. The load energizing circuit of claim 1, in which a transformer including a first and a second winding connected to said first and second terminal, respectively, is used to provide isolation between the turn-on and turn-off circuits of said primary switching device.

5. The load energizing circuit of claim 1, in which said timing means includes a first capacitor and a first resistor in series connected across said source; a second semiconductor switching device having a normally-disabled anode-cathode path connected across said capacitor, and a gate electrode; means for biasing that gate electrode from said source to control the firing potential of said second device; another capacitor-resistance means connected across the anode-cathode path of said second device; means for holding said first capacitor in the discharged condition when said primary device is disabled, and responsive to the enabling of said primary device by each starting pulse applied to its gate electrode through said first control terminal to cause the charging of said first capacitor through aid first resistor from said source to begin; means responsive to the enabling of said second switching device when the charge on said first capacitor exceeds its firing potential to cause the discharge of said capacitor through that device and said other capacitor-resistance means; and means responsive to the discharge of said first capacitor through said other capacitor-resistance means to cause the application of a stop pulse to the gate electrode of said primary device through said second terminal disabling that device and returning all circuit elements in said timing means to their initial unoperated condition.

6. The load energizing circuit of claim 1, in which said timing means includes a capacitor and a first resistor in series connected across said source; a second switching device of the double-base semiconductor type having a first and a second base electrode and a gate electrode; a second resistor, said first base electrode being connected through said second resistor to the positive terminal of said source and said second base terminal being connected to the negative terminal of said source and being coupled through said second terminal to the gate of said primary switching device; a junction point between said capacitor and said first resistor connected to the gate of the second switching device to control its firing potential; means for clamping said junction points at ground potential through said load to hold said capacitor in the discharged condition when said primary device is disabled, and for unclamping said junction point from ground in response to the enablement of said primary switching device by each starting pulse applied to its gate electrode through said first terminal so that said capacitor begins to charge from said source through said first resistor and said junction point; the resulting potential of said junction point when it exceeds the firing potential of the second switching device causing that device to be enabled and said capacitor to be discharged therethrough; and means responsive to the discharge for causing a negative stop pulse to be applied through said second terminal to the gate of said primary switching device causing that device to be disabled to stop the flow of energizing power to the load and to return said timing means to the initial unoperated condition ready for the next start pulse.

7. The circuit of claim 1, in which a transformer having a turn-on and turn-off winding is used for applying each start and stop pulse to the gate of said primary device through said first and second terminal, respectively, to provide isolation between the turn-on and turn-off controls of said primary device; said timing means includes a first capacitor and a first resistor in series connected across said source; a second resistor; a second switching device of the semiconductor double-base type having two base electrodes and a gate electrode, a first one of said base electrodes being connected through said second resistor to the positive terminal of said source and the second base electrode being connected through the turn-off winding of said transformer to the negative terminal of said source; the gate electrode of said second device being connected to a first junction point between said first capacitor and said first resistor; means connected between said first junction point and a second junction point of the first switching device and said load for clamping said first junction point to ground through said load so as to maintain the said first capacitor in the discharged condition when said primary switching device is in the disabled condition, and responsive to the enabled condition of said primary switching device caused by each starting pulse applied to its gate electrode through the turn-on winding of said transformer to unclamp the said first capacitor from ground so as to permit it to begin to charge through said first resistor with a time constant of RC; said second switching device when the voltage at said first junction point exceeds the firing potential of said gate of said second device, causing the firing of that device and the discharge of said capacitor therethrough; and means responsive to the discharge for causing a negative pulse to be supplied through said turn-off winding to the gate of said first device rendering it non-conductive to cut off the supply of energizing power to the load.

8. The load energizing circuit of claim 5, in which a first transformer including a turn-on and a turn-off winding is used for respectively coupling the starting and stopping pulses to the gate of said primary device, and said circuit means includes a second transformer having an input and an output winding, said input winding connecting said second base electrode of said second switching device to ground, a second capacitor and a third resistor of relatively large resistance value in series connected across said output winding, a high power, four-layer semiconductor diode having a cathode and anode which connects a second junction point between the second capacitor and said third resistor through the turn-off winding of said first transformer to the positive terminal of said voltage source, and a third capacitor connected across said semiconductor diode and said turn-off winding in series;

the discharge of said first capacitor through said second device in response to a starting pulse producing a negative pulse in the output winding of said second transformer which is applied via said second capacitor and said second junction point to the cathode of the semiconductor diode to turn that diode on, causing said third capacitor, previously charged through said third resistor from said source, to discharge through said semiconductor diode and said turn-off winding to produce an induced negative pulse at the gate of said primary switching device which turns it off stopping the energization of the load from said source and after said third capacitor is completely discharged, the semiconductor diode turns off due to the lack of sufficient holding current through said third resistor of large resistance value so as to return all circuit elements of said timing means to the initial unoperated condition.

9. The load energizing circuit of claim 1, in which said timing means includes a first capacitor and a first resistor connected in series across said source; a second switching device of the semiconductor control rectifier type having a cathode, an anode and at least one gate electrode, the anode-cathode path of said second device being connected across said first capacitor; a power divider connected across said anode-cathode path of said second device and said first resistor in series, and having an intermediate voltage point connected to said one gate so as to control the firing potential of said second device; circuit means including a second capacitor and a second resistor connected in series across said anode-cathode path of said second device; means for clamping a first junction point between said first capacitor and said first resistor to ground potential through said load to hold said first capacitor in the discharged condition when said primary switching device is in the disabled condition, and responsive to the enabled condition of said primary switching device provided by the application of a starting pulse to the gate thereof through said first terminal, to unclamp said first junction point from ground so as to permit the charging of said first capacitor and said second capacitor to begin through said first resistor from said source to raise the potential of said first junction point; said second switching device firing in response to the potential of said first junction point when it reaches said firing potential to render that device conductive to discharge the first and second capacitor therethrough: a second junction point in said circuit means between said second capacitor and said second resistor; and means responsive to the charged potential of said second junction point due to the discharge of said second capacitor for applying a negative pulse to the gate of said first device through said second terminal which will cause that device to be turned off to remove the supply of energizing power to said load from said source.

10. The load energizing circuit of claim 5, in which said load is an electromagnetic relay having its magnetic core connected in series with the anode-cathode path of said primary switching device between the positive terminal of said source and ground, said coil having a direct current resistance which is small compared to the resistance value of said first resistor so that said capacitor is connected to ground potential by said holding means when the anode-cathode path of said primary device is in the disabled condition.

11. The energizing circuit of claim 5, in which said second switching device is a silicon controlled semiconductor rectifier.

References Cited

UNITED STATES PATENTS 3,265,938 8/1966 Daien ------------ 317—155.5

MILTON O. HIRSHFIELD, *Primary Examiner.*

J. A. SILVERMAN, *Assistant Examiner.*